Feb. 17, 1970   E. EVALDS ET AL   3,495,777
PROPORTIONAL TEMPERATURE REGULATION SYSTEM
Filed May 16, 1967

INVENTOR.
EGILS EVALDS
THEODORE J. BRENNAN
BY *William E. Shearon*
ATTORNEY.

United States Patent Office 3,495,777
Patented Feb. 17, 1970

3,495,777
PROPORTIONAL TEMPERATURE REGULATION SYSTEM
Egils Evalds, Ardmore, and Theodore J. Brennan, Norristown, Pa., assignors to Athena Controls, Incorporated, Conshohocken, Pa., a corporation of Pennsylvania
Filed May 16, 1967, Ser. No. 638,980
Int. Cl. G05d 23/20; H01h 47/24
U.S. Cl. 236—78     10 Claims

ABSTRACT OF THE DISCLOSURE

This device provides a light source and light sensitive device between which a means for proportionally interrupting, and/or intercepting, the light is disposed. The light interceptor is moved in response to the temperature of the item, or area, being monitored. The light sensitive device controls the amount of energy applied to the heat generator in accordance with the amount of light that passes beyond the interceptor, i.e., from the light source to the light sensitive device.

---

This invention relates to temperature regulating devices and in particular to a temperature regulating device that proportionally controls the temperature.

BACKGROUND

In one group of prior art arrangements for controlling the temperature of a given item, e.g., a room, a furnace or the like, the control circuitry is in either an "on" or an "off" state as opposed to proportional control. Because the electronic hardware is relatively simple, these devices have had good application in systems where there is no fast response needed or in systems where a predetermined average temperature is not a necessity.

In another group of prior art arrangements for regulating temperatures, proportional control means have been employed. These systems require more complicated electronic hardware than the first group but are systems which can offer a fast response and good averaging of temperatures.

The present invention is characterized by the simple electronics of the first group and the proportional control means of the second group. In addition, the present invention enables a simple two wire connection of the temperature control elements to the power source of the system.

SUMMARY

The present system, in a preferred embodiment, provides for connecting the heat generator in series with a bidirectional controllable switch across a source of A.C. power. The control circuitry for the switch is connected through a bidirectional current conducting light sensitive device to the power line. A light source is disposed in close proximity to the light sensitive device and there is a light interceptor means movably mounted between the light source and the light sensitive device. The interceptor is mechanically connected to a temperature sensitive device which is located at a point of monitoring. The temperature sensitive device moves the interceptor in and out of the channel between the light source and the light sensitive device, thereby controlling the switch in response to the temperature at the monitoring point of the item being heated. Accordingly, the heat generator provides heat which is proportional to the response of the temperature sensitive device and accordingly which is proportional to the amount of light interrupted or blocked by the interceptor.

Figure 1:
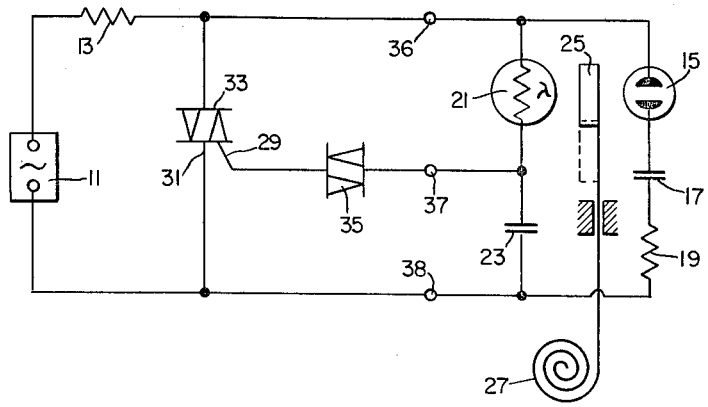
Figure 2:
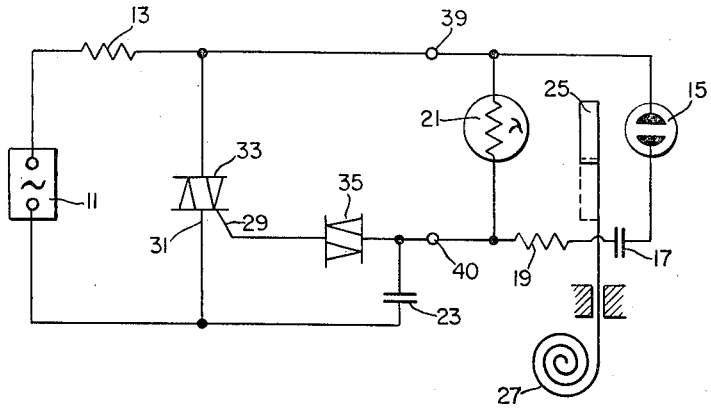
Figure 3:
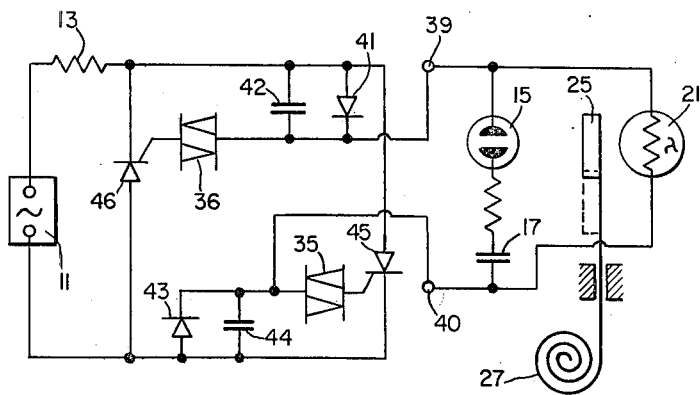

The objects and features of this invention will be better understood by studying the description set forth hereinafter in conjunction with the drawings, in which:

FIGURE 1 is a schematic of one embodiment of the present invention;
FIGURE 2 is a schematic of a second embodiment of the present invention; and
FIGURE 3 is a schematic of a third embodiment of the present invention.

Consider FIGURE 1 which shows a schematic of one embodiment of the invention. In FIGURE 1 there is an A.C. electrical power source 11 which provides electrical energy to the heater element 13. Assume that the heater element 13 is a heat generator for a room or a furnace or the like. Connected in series across the power source 11 and the heater 13 are a lamp 15, a capacitor 17 and a resistor 19. Also connected in series across the power source 11 and heater 13 are a bidirectional photosensitive device 21 and a capacitor 23. The photo-sensitive device can be an NSL–15 manufactured by National Semiconductor, Limited.

In between the lamp 15 and the photo-sensitive device 21 there is located a shade element 25. The shade element 25 can be made of shim stock. The shade element 25 acts to interrupt and absorb the light passing from the light source 15 to the light sensitive device 21. The shade element 25 is mechanically connected to a bimetal thermal sensor 27.

Bimetal sensors are well known and the principles of operation thereof are also well known. As the bimetal sensor becomes heated (i.e., the ambient temperature increases) the spring like structure unravels and pushes the shade element further between the lamp 15 and the photosensitive element 21. It becomes clear from FIGURE 1, that as the shade 25 is moved further into the channel between the lamp 15 and the photo-sensitive device 21 (for instance from the dashed line position to the solid line position) the light hitting, or reaching, the photosensitive device 21 is diminished.

It should be understood that when the light sensitive device 21 is subjected to full light, it conducts relatively heavily, while when it is exposed to a small amount of light, there is very little current conduction therethrough. When current conducts through the photo-sensitive device 21, it charges the capacitor 23. Since the capacitor 23 and the photo-sensitive device are subjected to an A.C. current input, the capacitor 23 is charged in one direction on one half of the cycle, discharged and charged in the other direction on the other half of the cycle.

When the capacitor 23 is sufficiently charged so that there is a predetermined difference in potential across the control element 29 and the lower conducting element 31, the triac 33 will conduct. A triac is in effect a bidirectional silicon controlled rectifier capable of conducting current in both directions in response to a difference of potential across the control element 29 and the lower conducting element 31 in either of the two directions of conductivity. Connected between the control element 29 and the capacitor 23 is a bidirectional conducting diode 35 called a diac. The diac 35 provides additional bias between the control element 29 and the lower conducting element 31. In addition the breakdown voltage of the diac gives a sharp control pulse and minimizes false firing.

The operation of the control system in FIGURE 1 is set forth hereinafter. Consider that a hot house, used for growing plants in a nursery, is the object of the temperature control. At one end of the hot house there is a heat generator means. In our hypothetical assume that the source of heat is electrical in nature and is represented by the resistor 13. It should be understood that other forms of heat generators could be employed. For instance, an oil-hot air system could be used or a gas-hot air system could be used, as well as others. In the last two cited examples, the start up mechanism and the blowers would be operated in response to a signal from the control circuitry of the present invention.

To continue with the description of the operation, further assume that the bimetal sensor 27 with the shade 25 is physically located in the hot house at some remote location from the heat source. At this remote location and adjacent to the sensor 27, the light source 15 and the photocell 21 will also be located. The light source 15 will have its associated capacitor 17 and associated resistor 19 included at the remote location. Now it should be understood that the control circuitry just described does not have to be at a remote location, but is so illustrated because this is very often desirable.

The control circuitry last described is connected to the power circuitry by three wires (which are physically strung along the hot house) secured to the terminals 36, 37 and 38.

Further assume that the remote location is cold, i.e., experiencing a temperature which is colder than considered necessary. Under this last condition, the sensor 27 is wound relatively tight (i.e., non-expanded) and the shade is in the dashed line position. At this time, the A.C. source 11 is providing a signal through the heater to the lamp 15, therethrough to the capacitor 17. This is an A.C. signal and the capacitor 17 is chosen to be sufficiently small that it becomes fully charged early in the first half of the cycle. Accordingly, the lamp 15 is illuminated for only a portion of each half of the cycle. While this time can vary from one embodiment to another, I have chosen capacitor 17 to be .01 mfd. and resistor 19 to be 22K ohms so that when the A.C. source is 60 cycle current, the lamp is on for approximately 1 msec.

The reason for turning the lamp on for only a portion of each half cycle is to eliminate any spurious conditions which may arise due to loading the line when the heater is heavily conducting. In other words, when the heater 13 is conducting heavily, the lamp 15 might well provide less illumination, than under less load, thereby creating a false condition, indicating that the heat is high. The foregoing would be true under high temperature (as will be further discussed below) there is greater interception of the light. The photocell recognizes this condition by being exposed to less light impingement. It follows that more actual shading or less illumination from the lamp would each cause the photocell to react the same way.

The light which is generated by the lamp 15 during the half cycles impinges on the photocell 21 and reduces the resistance thereof. The reduced resistance of the photocell 21 enables a large current to pass therethrough and charge up the capacitor 23. Assuming that the shade 25 is positioned to permit the full impingement of the light to strike the photocell 21, the photocell 21 and the capacitor 23 are chosen such that capacitor 23 will be charged to a great extent.

When capacitor 23 is greatly charged there is a difference of potential thereacross which causes the triac 33 to conduct. When the triac 33 conducts, there is heavy current conducting through the heater and hence heat is generated and transferred (by some method such as a blower) to the cold remote location. It should be understood that the heat will be generated, as just described, twice during each cycle of applied current from the source. This condition averages into a steady state supply of heat.

As the remote location begins to warm, the sensor 27 commences to unwind and move the shade 25 between the lamp 15 and the photocell 21. As the shade 25 intercepts the light from the lamp 15, the resistance of the photocell 21 becomes increasingly higher (i.e., it decreases by lesser amounts) and less current conducts to the capacitor 23. Since less current is passed to the capacitor 23, it follows that the capacitor 23 remains charged to the threshold value (i.e., the value necessary to fire the triac) for shorter periods of time. Hence, the triac 33 conducts for shorter periods of time and there is proportionally less heat generated. In effect then as the remote location becomes warmer, there is less heat needed and by the proportional control less heat is generated.

Finally, when the remote location is heated to the desired temperature, the bimetal sensor 27 will have been unwound enough to move the shade to a position where it completely blocks the light emanating from the lamp. Hence, the photocell 21 will constitute a high resistance and the current flow to the capacitor 23 will be sufficiently small so that the triac 33 will not fire. If the triac 33 does not fire, the heavy currents through the heater 13 will not come into being and hence the heat will be cut off or drastically reduced.

It becomes apparent that when the remote location starts to cool below the desired temperature, the bimetal sensor 27 will commence to wind and retract the shade. Accordingly, the light from the lamp 15 will strike the photocell 21 starting the heater operation and causing the heating process to be repeated.

The circuit shown in FIGURE 2 is identical to the circuit shown in FIGURE 1 with one exception. The capacitor 17 is common connected to the capacitor 23 along with the photocell 21. This arrangement enables the control circuitry composed of the lamp 15, the capacitor 17 and the photocell 21 to be located in a remote place from the power circuitry and necessitate only two wires for the connection thereto. For instance, if the last mentioned control circuitry is physically located in the remote location, this embodiment requires that only two wires, and not three wires, be run from the remote location to the power supply. To two wires would be connected at the terminals 39 and 40. The opportunity to be able to use a two wire connection instead of three wire connection is clearly advantageous from the standpoint of cost and installation. The operation of this circuit is clear from the description of the FIGURE 1 circuit operation.

The circuit shown in FIGURE 3 is similar to the circuits of FIGURES 1 and 2 and wherever possible the same identification numerals are used. To consider the operation of the third embodiment, again assume that the shade 25 is not blocking the light from the lamp 15 to the photocell 21.

Current will flow during the positive half of the cycle (the convention being arbitrarily chosen) from the A.C. power source 11, thorugh the heater 13, through the diode 41 and the capacitor 42, through the lamp 15 to the capacitor 17. As in the previous operation, the capacitor 17 becomes fully charged early in the half of the cycle so that the photocell 21 receives a burst of light for only a portion of each half of the cycle. When the lamp transmits light to the photocell 21, the resistance decreases and there is a surge of current therethrough to charge the capacitor 44 beyond the threshold to fire the silicon controlled rectifier 45 (hereinafter referred to as an SCR). The capacitor 44 becomes discharged during the negative half of the cycle, but cannot charge appreciably in the negative direction since it is shunted by the diode 43 conducting.

While the capacitor 44 is discharged at the threshold value of diac 35 and SCR 45, and SCR 45 is conducting, there is heavy current passing through the heater 13 to provide heat to the remote location. It should be noted that while capacitor 42 may also be charged to threshold value during the positive half of the cycle, the polarities are not in the proper direction to fire the SCR 46. Normally this would not occur anyway since diode 41 conducts in parallel with capacitor 42 on the positive half cycle.

On the negative half of the cycle, the capacitor 42 gets charged in the proper direction to fire the SCR 46 and hence there is heavy current through the heater 13 during each half cycle of the operation. Hence the heat which is generated averages to a constant supply of heat. It becomes apparent from a consideration of the operation of the other embodiments, that as the remote location becomes warmer, the bimetal sensor 27 unwinds and the light passing from the lamp 15 to the photocell 21 becomes blocked by the shade 25. As the light gets blocked, the current through the heater diminishes and of course, as the light increases (in response to a cold situation) the heat increases.

The present invention provides a number of advantages over other control systems. The present invention is relatively uncomplicated from an electronic hardware point of view, while providing proportional control. The present system employs a mechanical sensor which has certain advantages for a number of applications, such as: low cost, low force required, high leverage mechanical gain, no contacts to wear out, and no arcing. The present system enables a remote location of the control circuitry (i.e., remote from the power supply) as well as a low power condition at the remote location. The present invention permits the control circuitry at the remote location to be connected to the power supply with a minimum number of lead-in wires, and the wiring does not have to observe any polarity (phasing).

The embodiments of the invention in which an exclusive property or privilege is claimed are defined as follows:

1. A mechanism to be used with a heat source means for proportionally controlling the temperature of a particular item comprising in combination: light generating means including a resistor-capacitor circuit to set the time period of light generation to compensate for any variations in supply power applied to said mechanism; light sensitive means having the capacity to pass and alternatively impede signals in accordance with the amount of light impinging thereon, said light sensitive means disposed in close proximity to said light generating means to directly receive light transmitted therefrom; movable light intercepting means disposed to be moved into the path of said light transmitted between said light generating means and said light sensitive means; temperature sensitive means which is physically moved in response to changes in temperature affecting said item, said movement being proportional to the temperature of said item; means coupling said light intercepting means to said temperature sensitive means to be moved thereby; and electronic switching means having first and second current conducting means and control means and further including bias means, said electronic switching means connected to both said light sensitive means to be biased thereby and to said heat source means to be responsive to signals passed and alternatively not passed by said light sensitive means to cause heat to be porportionally generated by said heat source means.

2. A mechanism for proportionally controlling the temperature of a particular item according to claim 1 wherein said light generating means and said light sensitive means are connected in parallel and said electronic switching means are connected across said last-mentioned parallel connection to effect a two wire connection of said electronic switching means across said last-mentioned parallel connection.

3. A mechanism for proportionally controlling the temperature of a particular item according to claim 1 wherein said light generating means includes a light bulb connected in series with a first capacitor, said first capacitor being chosen to have a value which will enable it to be fully charged in less than one fourth of the cycle of an applied A.C. power.

4. A mechanism for proportionally controlling the temperature of a particular item according to claim 1 wherein said circuitry means includes a second capacitor connected in series with said light sensitive means and electronics switching means connected across said series connected light sensitive means and said second capacitor and further connected to said last-mentioned series connection to enable said electronics switching means to be turned on in response to a predetermined charge being developed on said second capacitor.

5. A mechanism for proportionally controlling the temperatures of a particular item according to claim 4 wherein said electronic switching means includes a bi-directional silicon controlled rectifier means having a control element and a bidirectional diode means connected to said control element.

6. A mechanism for porportionally controlling the temperature of a particular item according to claim 1 wherein said temperature sensitive means includes a bimetal temperature sensitive means which unwinds in response to high temperatures and winds in response to lower temperatures.

7. A mechanism for proportionally controlling the temperature of a particular item according to claim 1 wherein said circuitry means includes a pair of silicon controlled rectifiers which are connected across said light sensitive means so that one silicon controlled rectifier thereof will conduct, when properly biased, on one half on an A.C. power cycle and the other silicon control rectifier thereof will conduct, when properly biased, on the other half of said A.C. power cycle.

8. A mechanism for proportionally controlling the temperature of a particular item according to claim 7 wherein said pair of silicon controlled rectifiers each has a control element and each of said control elements is connected in series to a different associated capacitor whose value is such that when it is partially charged it provides a sufficient difference of potential to bias its associated silicon controlled rectifier through its associated control element.

9. A mechanism for proportionally controlling the temperature of a particular item according to claim 2 wherein said electronic switching circuitry means includes an electronic circuit with a control element and wherein said control element is connected to said parallel connection of said light generating means and said light sensitive means.

10. A mechanism for proportionally controlling the temperatures of a particular item according to claim 9 wherein said circuitry means further includes a capacitor which is connected to the connection between said control element and said parallel connection of said light generating means and said light sensitive means, and wherein said capacitor has a value such that when it is partially charged it provides a sufficient difference of potential to activate said control element.

References Cited

UNITED STATES PATENTS

| | | | |
|---|---|---|---|
| 1,602,092 | 10/1926 | Witz | 236—1 |
| 1,758,450 | 5/1930 | Machlet | 236—69 |
| 2,096,025 | 10/1937 | Bell | 178—69 |
| 2,136,900 | 11/1938 | Woolley. | |
| 3,344,850 | 10/1967 | De Forest | 165—26 |
| 3,309,498 | 3/1967 | Nagy et al. | 250—231 X |
| 3,341,665 | 9/1967 | Merkel et al. | 317—124 X |
| 3,360,650 | 12/1967 | Lawrence | 250—205 X |
| 3,366,834 | 1/1968 | Potter | 250—205 X |
| 3,371,268 | 2/1968 | Knudsen | 219—502 X |

WILLIAM E. WAYNER, Primary Examiner

U.S. Cl. X.R.

219—502; 307—311; 317—124; 315—158; 250—231